(12) United States Patent
Cho

(10) Patent No.: US 12,139,038 B2
(45) Date of Patent: Nov. 12, 2024

(54) ELECTROMECHANICAL DRIVE APPARATUS, BRAKING SYSTEMS, AND BATTERY MANAGEMENT SYSTEMS

(71) Applicants: DdaniGo LLC, Santa Clara, CA (US); Coetec Company Limited, Seoul (KR)

(72) Inventor: Chong Du Cho, Santa Clara, CA (US)

(\*) Notice: Subject to any disclaimer, the term of this patent is extended or adjusted under 35 U.S.C. 154(b) by 876 days.

(21) Appl. No.: 16/928,038

(22) Filed: Jul. 14, 2020

(65) Prior Publication Data

US 2021/0170905 A1 Jun. 10, 2021

Related U.S. Application Data

(63) Continuation of application No. 16/595,296, filed on Oct. 7, 2019, now abandoned.

(51) Int. Cl.
*H02J 7/00* (2006.01)
*B60L 58/12* (2019.01)
(Continued)

(52) U.S. Cl.
CPC ............... *B60L 58/12* (2019.02); *B60L 58/22* (2019.02); *B60Q 9/00* (2013.01); *B60R 16/0207* (2013.01); *B60R 16/0231* (2013.01); *F16D 55/225* (2013.01); *F16D 63/002* (2013.01); *F16D 65/18* (2013.01); *G07C 5/0808* (2013.01); *G07C 5/0816* (2013.01); *H02J 7/0014* (2013.01); *H02J 7/0029* (2013.01); *H02J 7/0048* (2020.01); *B60K 1/02* (2013.01); *B60L 2240/545* (2013.01); *B60L 2240/547* (2013.01); *B60T 1/065* (2013.01); *B60T 13/746* (2013.01); *F16D 2055/0016* (2013.01); *F16D 55/22* (2013.01); *F16D 55/226* (2013.01); *F16D 2121/24* (2013.01)

(58) Field of Classification Search
USPC ........................................................ 320/116
See application file for complete search history.

(56) References Cited

U.S. PATENT DOCUMENTS

2012/0256569 A1\* 10/2012 Kawahara ........... H01M 10/613
 374/142
2013/0026979 A1\* 1/2013 Endo ..................... H02J 7/0068
 320/107

(Continued)

*Primary Examiner* — Samuel Berhanu
(74) *Attorney, Agent, or Firm* — The Law Office of Herbert T. Patty

(57) ABSTRACT

A dual motor powered compact drive comprises two electrical motors powering the planetary gear mechanism. The dual drive can provide variable speed and torque. A single electric motor operated braking system with a screw-driven wedged brake pads is described using a compact test set-up. The system comprises at least one motor and a screw shaft connected to transmit the power to a sliding plunger, and braking pads located on a braking disc, and a force sensor applied to measure the braking force, and a device to measure the parameters of the braking motor and the parameters are used as the inputs to establish a control strategy. Systems and methods for monitoring a battery pack including multiple cells are provided. The battery management system further comprises a control strategy for implementing a balancing algorithm. A balancing strategy comprises a determination of battery cells to be balanced, and a calculated balancing current.

16 Claims, 14 Drawing Sheets

(51) Int. Cl.
  *B60L 58/22*      (2019.01)
  *B60Q 9/00*       (2006.01)
  *B60R 16/02*      (2006.01)
  *B60R 16/023*     (2006.01)
  *F16D 55/225*     (2006.01)
  *F16D 63/00*      (2006.01)
  *F16D 65/18*      (2006.01)
  *G07C 5/08*       (2006.01)
  *B60K 1/02*       (2006.01)
  *B60T 1/06*       (2006.01)
  *B60T 13/74*      (2006.01)
  *F16D 55/00*      (2006.01)
  *F16D 55/22*      (2006.01)
  *F16D 55/226*     (2006.01)
  *F16D 121/24*     (2012.01)

(56) References Cited

U.S. PATENT DOCUMENTS

2014/0266062 A1\* 9/2014 Lee .................. H02J 7/0016
                                                320/134
2016/0156202 A1\* 6/2016 Kim .................. H02J 7/0014
                                                320/134
2017/0256973 A1\* 9/2017 Kim .................. H02J 7/0071
2018/0186241 A1\* 7/2018 Harvey ................ B60L 53/14

\* cited by examiner

ELECTROMECHANICAL DRIVE APPARATUS, BRAKING SYSTEMS, AND BATTERY MANAGEMENT SYSTEMS

CROSS REFERENCE TO RELATED APPLICATIONS

This is a Continuation Application of U.S. patent application Ser. No. 16/595,296 filed on Oct. 7, 2019, which claims priority to U.S. Provisional Application Ser. No. 62/766,807 filed on Nov. 3, 2018, U.S. Provisional Application Ser. No. 62/919,482 filed on Mar. 15, 2019, and U.S. Provisional Application Ser. No. 62/766,814 filed on Nov. 3, 2018, each of which is herein incorporated by reference for all purposes.

TECHNICAL FIELD

This invention relates generally to the field of propulsion, braking, and battery management systems employed in the use of electromechanical systems.

BACKGROUND

Electromechanical systems using a single motor suffer from poor performance and poor efficiency. Examples of these types of systems may include light mobility vehicles such as electric scooters, electric bicycles, small cars, industrial robots, and the like. Electromechanical systems employing dual motors may overcome many of these issues.

The development of drive-by-wire technology has increased the need for electromechanical braking systems. Although many transportation systems are equipped with electromechanical braking systems, the existing systems are not efficient and reliable. Therefore, there is a need for innovation and development of an efficient braking mechanism comprising electric motors. Wedge based braking is one innovative approach towards increasing braking efficiency with its self-energizing capability but is known to suffer jamming issues.

Many of the electromechanical braking systems are limited to moderate and heavy commercial vehicles. The electromechanical braking systems described herein are suitable for application to lightweight personal mobility and commercial vehicles. These systems have the added advantage of being compact.

Battery usage is ubiquitous in electronic devices and more specifically in simple transportation systems such as electronic bikes, electric scooters, and electric motorcycles. Batteries can provide power to the systems and reduce travel time. In practice, different devices may work using different voltages and battery problems may affect its usage and may cause serious accidents. Thus, batteries should be managed during the operation of the devices with innovative battery management systems. Different types of batteries may have different management systems which cannot be applied across the different types of batteries. This results in increased cost and extended development periods. In addition, batteries should be balanced as each battery cell has different charging and discharging characteristics. Failure to balance the batteries results in a reduction in the lifetime of the batteries and may represent a hidden danger.

Therefore, a need exists in the art for electromechanical drive apparatus that offer improved performance and efficiency while supplying the desired torque and speed requirements. A need exists in the art for electromechanical braking systems that can be applied to lightweight personal mobility and commercial vehicles. A need exists in the art for battery management systems to optimize the use of battery power in electromechanical systems.

SUMMARY

Accordingly, and advantageously, some embodiments provide for the use of dual motors in electromechanical systems that meet the required torque and speed requirements while providing for improved performance and efficiency.

Electromechanical systems employing dual motors offer an alternative to systems employing single motors. The dual motor drive apparatus may offer improved performance and improved efficiency with continuously variable speed and torque.

One objective of the dual motor drive apparatus is to provide continuously variable speed with enhanced performance and efficiency in a compact package. Some embodiments involve the use of two motors. In some embodiments, a primary motor is employed for a fixed power output and sized for high efficiency. A secondary motor is employed to vary the speed for the desired output. The two motors are coupled together using a planetary gear mechanism. The primary motor drives the sun gear whereas the secondary motor drives the planet carrier. The output from the ring gear fixed to the case drives the wheel. These components are assembled on a fixed shaft inside a compact case which can be directly installed on a wheel or shaft for driving electromechanical systems.

This concept can also be extended to any type of motor/engine combinations, wherein the primary motor/engine is selected based on the torque requirements and the secondary motor is selected for desired speed variations. The planetary gear mechanism can be designed for the desired combination of input and output gears to meet the speed and torque requirements. Compound planetary gear mechanisms can be employed for sturdiness and flexibility in controlling speed and the torque.

Electric motor driven braking systems operating based on a wedge mechanism are presented as an innovative approach for implementing compact braking systems in a lightweight personal mobility and commercial vehicles. Compact electromechanical test fixtures are developed for performance evaluation of flat/wedge type braking systems.

For lightweight personal mobility and commercial vehicles, fixed caliper type braking systems are described which incorporate a flexible rotor. In some embodiments, a motor driven wedge brake pad forces the rotor against a fixed flat brake pad. The rotor undergoes elastic deformation as the brakes are applied, thus achieving a firm grip on the brakes and reducing brake slippage. Further, the wedge induced self-energized braking system reduces the effort of the brake motor.

Battery management systems are described comprising control units and balancing algorithms for efficient use of batteries as applied to electromechanical systems.

These and other advantages are achieved in accordance with the present invention as described in detail below.

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not to scale.

The techniques of the present invention can readily be understood by considering the following detailed description in conjunction with the accompanying drawings, in which.

DETAILED DESCRIPTION

Figure 1:
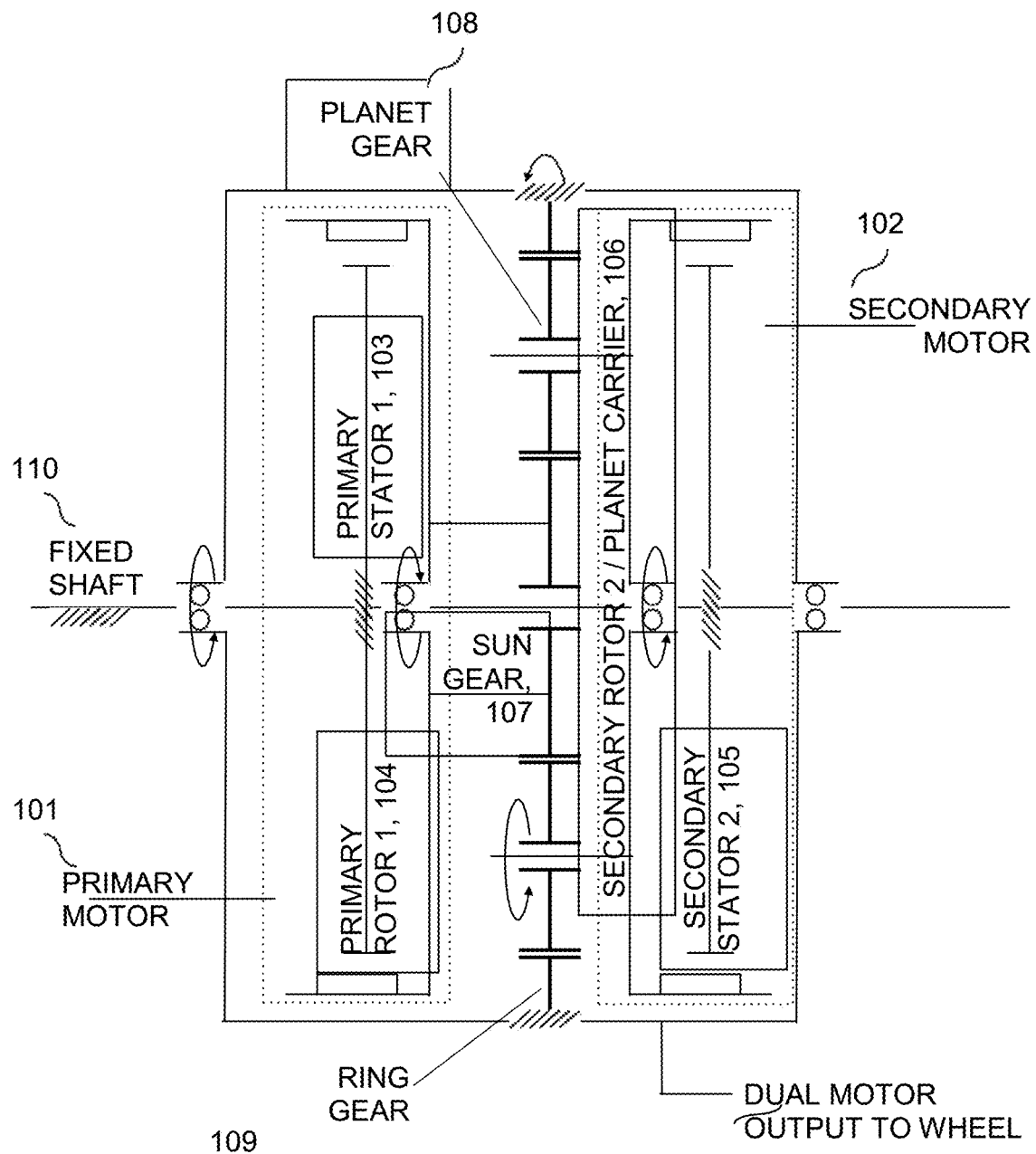
FIG. 1 is a schematic to illustrate an example of the dual motor drive apparatus.

A detailed description of one or more embodiments is provided below along with accompanying figures. The detailed description is provided in connection with such embodiments but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

It must be noted that as used herein and, in the claims, the singular forms "a," "an" and "the" include plural referents unless the context clearly dictates otherwise. Thus, for example, reference to "a component" includes two or more components, and so forth Where a range of values is provided, it is understood that each intervening value, to the tenth of the unit of the lower limit, between the upper and lower limit of that range, is encompassed within the invention. Where the modifier "about" or "approximately" is used, the stated quantity can vary by up to 10%

The term "horizontal" as used herein will be understood to be defined as a plane parallel to the plane or surface of the earth. The term "vertical" will refer to a direction perpendicular to the horizontal as previously defined. Terms such as "above", "below", "bottom", "top", "side", "higher", "lower", "upper", "over", and "under", are defined with respect to the horizontal plane. The term "on" means there is direct contact between the elements. The term "above" will allow for intervening elements As used herein, the terms "above" and "over" will be understood to mean either directly contacting or separated by intervening elements.

As used herein, the term "on" will be understood to mean directly contacting.

As used herein, the term "between" (when used with a range of values) will be understood to mean that both boundary values and any value between the boundaries can be within the scope of the range As used herein, the terms "first," "second," and other ordinals will be understood to provide differentiation only, rather than imposing any specific spatial or temporal order.

As used herein, the term "substantially" generally refers to ±5% of a stated value.

Electromechanical systems using a single motor drive apparatus suffer from poor performance and poor efficiency. Examples of these types of systems may include light mobility vehicles such as electric scooters, electric bicycles, electric motorcycles, small cars, industrial robots, micro mobility vehicles, and the like. Electromechanical systems employing dual motor drive apparatus may overcome many of these issues. In some embodiments, a dual motor drive apparatus comprises a planetary transmission unit installed directly on a wheel or shaft. The dual motor drive apparatus comprise two electrical motor inputs powering the planetary gear mechanism. The rotational output from the transmission directly drives the wheel or shaft. The dual motor drive apparatus may provide continuously variable speed and torque.

FIG. 1 is a schematic to illustrate an example of the dual motor drive apparatus. In some embodiments, dual motor drive apparatus, comprises primary motor, 101, and secondary motor, 102. Primary motor, 101, comprises primary stator, 103, and primary rotor, 104. Secondary motor, 102, comprises secondary stator, 105, and secondary rotor, 106. Dual motor drive apparatus, further comprises sun gear, 107, planet gear, 108, and ring gear, 109. Primary stator, 103, and secondary stator, 105, are rigidly fixed to fixed shaft, 110.

Figure 2:
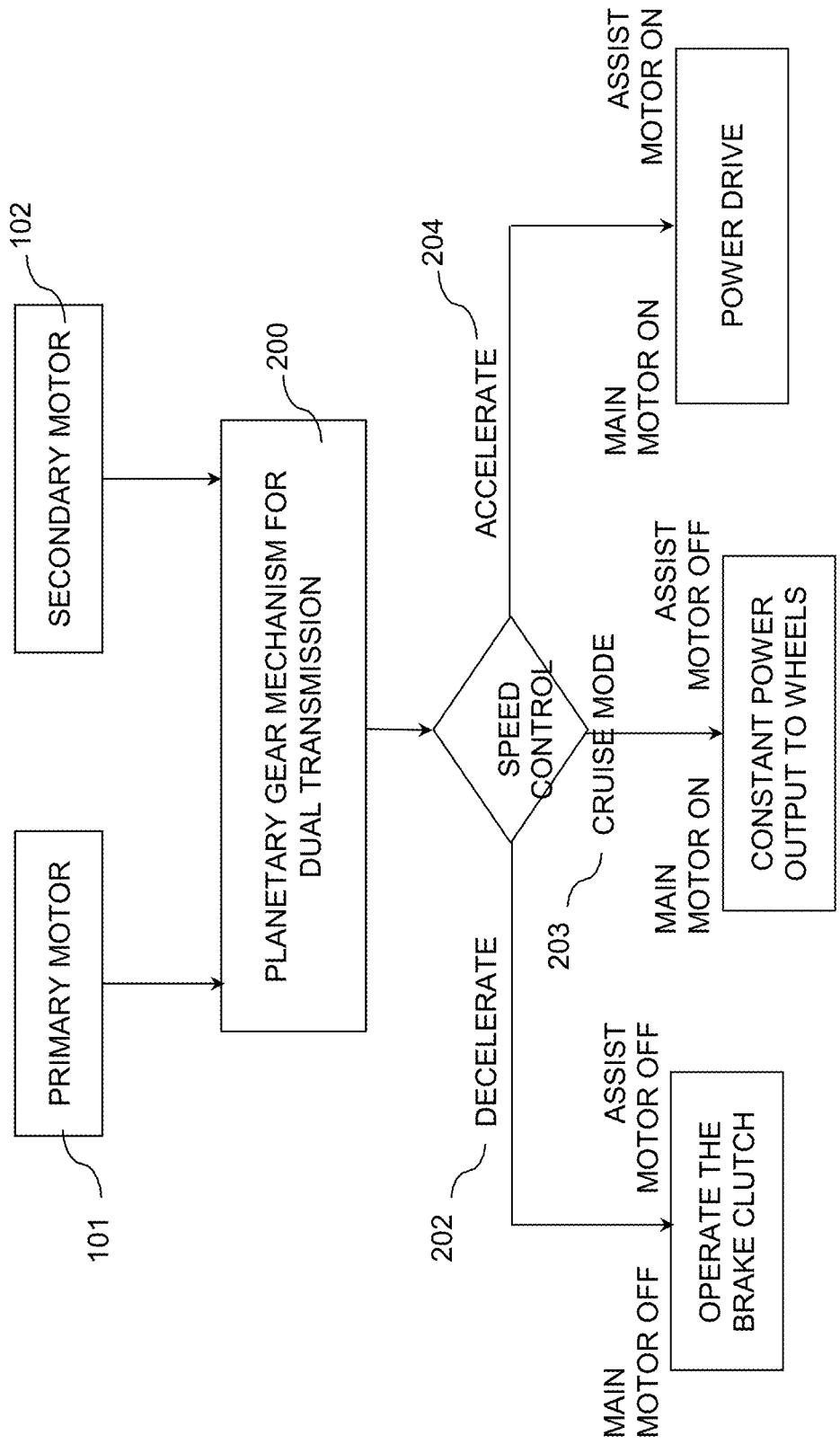
FIG. 2 is a flowchart of possible operation modes of the dual motor drive apparatus.

FIG. 2 is a flowchart of possible operation modes of the dual motor drive apparatus. For consistency, the same element numbers have been used as were used and described previously. The dual drive motor system comprises primary motor, 101, and secondary motor, 102 as described previously. These two motors are coupled with planetary gear mechanism, 200, to provide dual motor transmission of power. Those skilled in the art will understand that planetary gear mechanism, 200, comprises elements such as sun gear, 107, planet gear, 108, and ring gear, 109 described previously.

In some embodiments, dual motor drive apparatus provides the desired speed of the electromechanical system. In some embodiments, a decelerating speed mode (i.e. slowing down), 202, is required. In embodiments where the dual motor drive apparatus is requested to provide a decelerating speed, both the primary motor, 101, and the secondary motor, 102, are disabled and a braking system is employed.

In some embodiments, a constant speed mode (i.e. cruising), 203, is required. In embodiments where the dual motor drive apparatus is requested to provide a constant speed, the primary motor, 101, is engaged and the secondary motor, 102, is disabled.

In some embodiments, an accelerating speed mode (i.e. increased power), 204, is required. In embodiments where the dual motor drive apparatus is requested to provide an accelerating speed, the primary motor, 101, is engaged and the secondary motor, 102, is also engaged.

Figure 3:
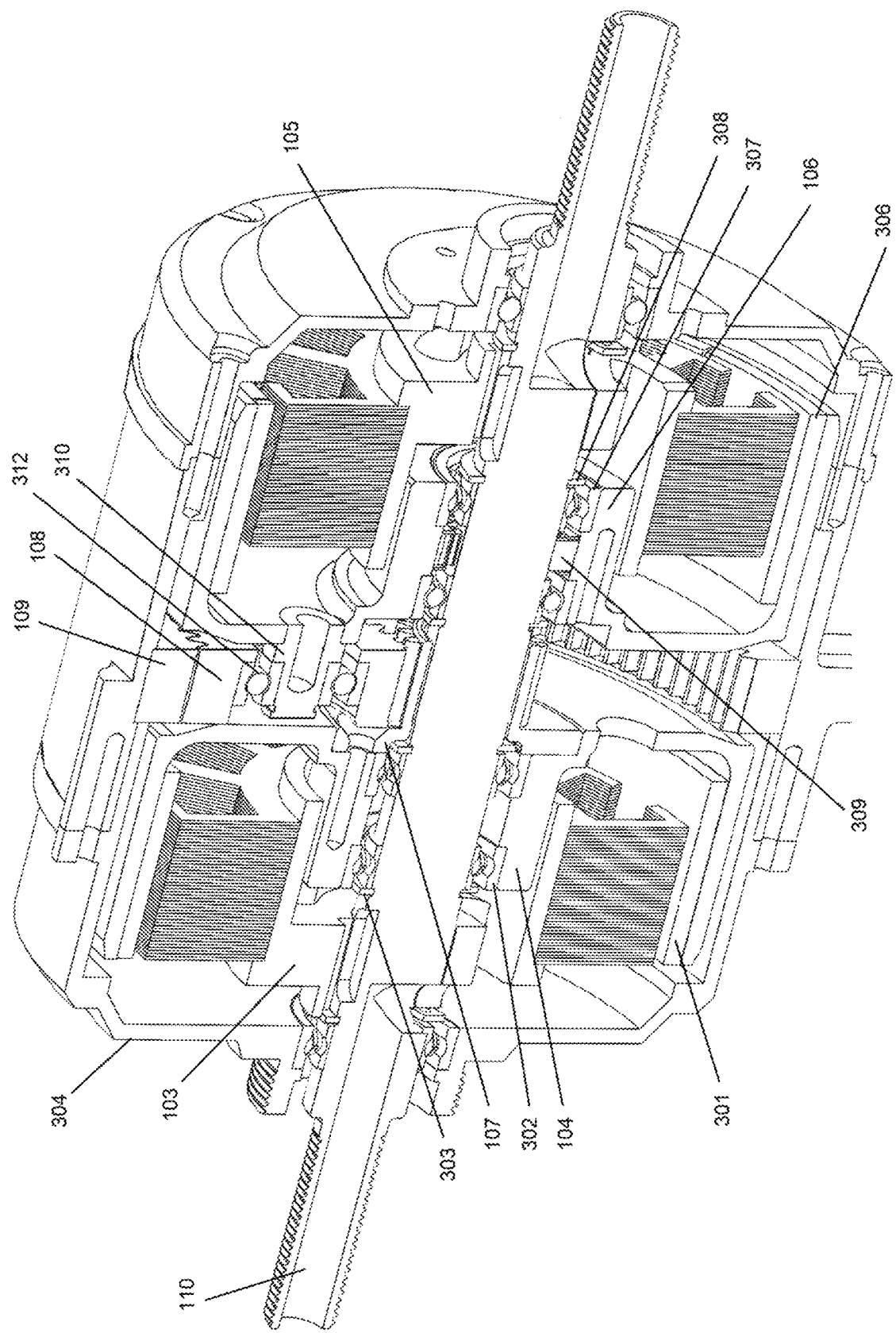
FIG. 3 is a cross-sectional drawing illustrating the assembly of the components.

FIG. 3 is a cross-sectional drawing illustrating the assembly of the components. For consistency, the same element numbers have been used as were used and described in FIG. 1. The primary stator, 103, of primary motor, 101, is rigidly connected to the fixed shaft, 110. The primary stator, 103, comprises copper windings around stacked laminates and drives the primary rotor, 104, due to the induced magnetic field. Primary rotor, 104, is constructed as a cylinder comprising permanent magnets, 301, on to its inner periphery. The primary rotor, 104, is connected to sun gear, 107, using fasteners and is operable to rotate the sun gear. The primary rotor, 104, is also connected to the fixed shaft, 110, using two ball bearings, 302, while circlips, 303, are used to constrain its axial movement. The sun gear, 107, drives the ring gear, 109, connected to the motor case, 304. The motor case, 304, is connected to the wheel as the dual motor drive apparatus output.

The secondary stator, 105, of secondary motor, 102, is rigidly connected to the fixed shaft, 110. The secondary stator, 105, comprises copper windings around stacked laminates and drives the secondary rotor, 106, due to the induced magnetic field. Secondary rotor, 106, is constructed as a cylinder comprising permanent magnets, 306, on to its inner periphery. The secondary rotor, 106, is connected to the fixed shaft, 110, using two bearings, 307, circlips, 308, and a sprag clutch, 309. Three sets of planet gears, 108, are mounted on the secondary rotor, 106.

In some embodiments, the rotation speed of the primary motor, 101, is held constant at a predetermined value to provide a constant power output from the dual motor drive apparatus. 101. The constant power output may be used to drive a wheel at constant speed or drive a shaft at constant rotation for various applications. As discussed with respect to FIG. 2, engaging only the primary motor can be regarded as the constant speed mode, 203. During the constant speed mode, 203, the secondary motor may not be engaged and the secondary rotor, 106, is constrained for reverse rotation induced by primary drive using sprag clutch, 309.

In some embodiments, the requirement for the dual motor drive apparatus is to provide accelerating speed. As discussed with respect to FIG. 2, engaging both the primary motor and the secondary motor can be regarded as the accelerating speed mode, 204. In some embodiments, during accelerating speed mode, engaging the secondary rotor, 106, and associated planet gears, 108, increases the speed of the ring gear, 109. This is additive to the power output of the primary motor and increases the overall power output of the dual motor drive apparatus. The limiting speed for the constant speed mode (i.e. primary motor only) can be selected based on calculations for maximum primary motor performance and efficiency. The requirement for additional speed or acceleration from the dual motor drive apparatus can be met by engaging the secondary motor without sacrificing the performance or efficiency of the primary motor.

In some embodiments, the dual motor drive apparatus is incorporated into light mobility vehicles such as electric scooters, electric bicycles, electric motorcycles, small cars, industrial robots, micro mobility vehicles, and the like.

Figure 4:
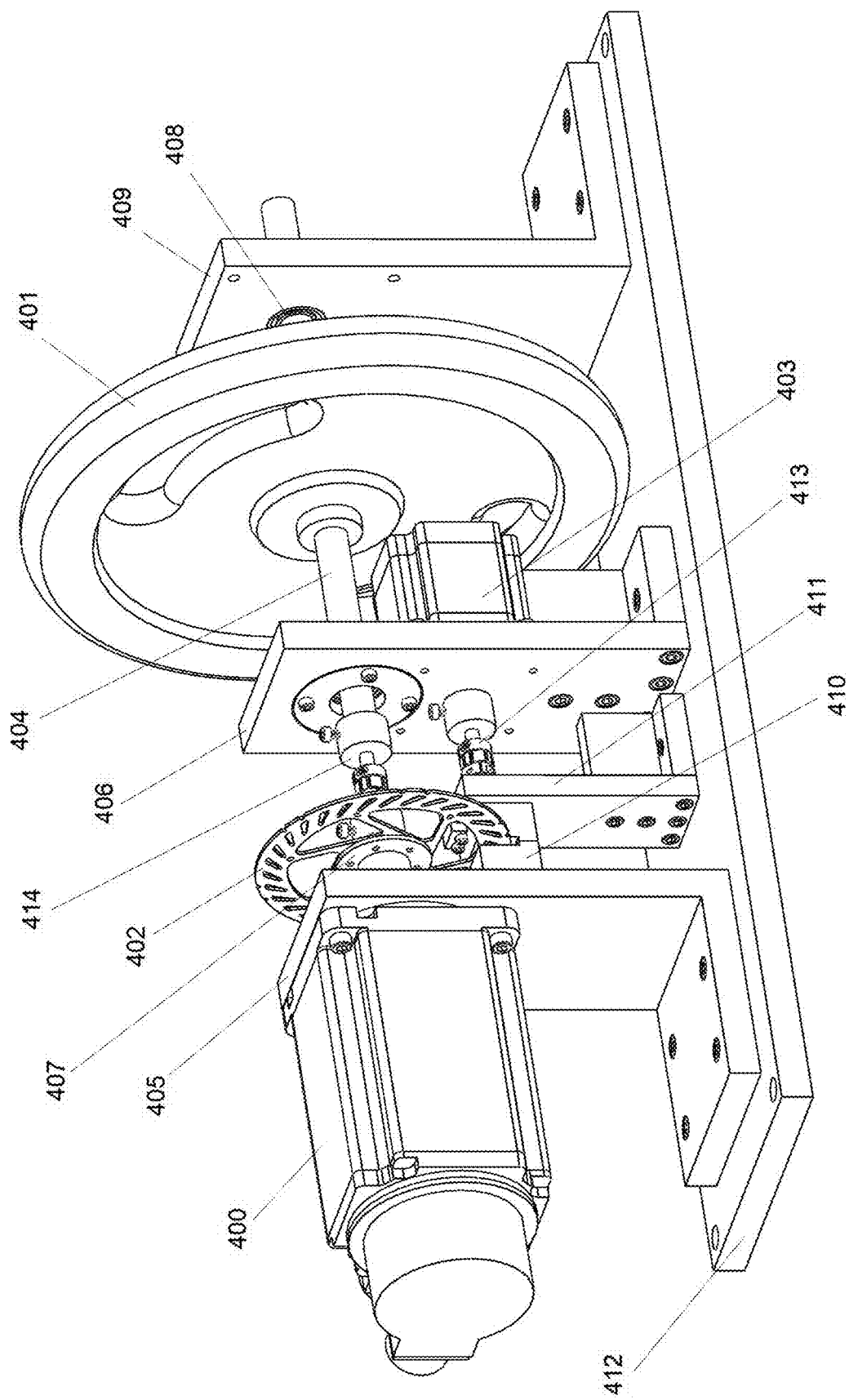
FIG. 4 is the schematic of the electromechanical wedge brake test fixture assembly.

FIG. 4 is the schematic of an electromechanical wedge brake test fixture assembly. In some embodiments, the test fixture comprises a driving unit and a braking unit. In some embodiments, the driving unit is an alternating current (AC) servo motor, 400, driven flywheel, 401, for applying inertial load to a flexible brake rotor, 402. In some embodiments, the wedge brake test fixture assembly comprises a brushless DC motor, 403, driven wedge mechanism for transferring the motor force to a flexible brake rotor, 402, connected to the driven shaft, 404.

In some embodiments, the servo motor, 400, and the brushless DC motor, 403, are mounted on clamping plates, 405, and 406, respectively. The shaft of the driving motor, 400, is connected to a flexible rotor, 402, through a flange, 407, and coupling 414. A flywheel, 401, on a bearing, 408, support between the clamping plates, 406, and 409, is coupled to the brake rotor, 402. The brake caliper, 410, holding all the brake components is mounted on a clamping plate, 411, via coupling, 413. The entire test fixture may be mounted to base plate, 412.

In some embodiments, the electronic control system and the control methods employed in the test fixture are included. In some embodiments, the driving motor, 400, and the brake motor, 403, are controlled using controllers and a user defined program wherein the user can input the desired parameters such as braking force, tuning parameters, etc. The test fixture is designed to measure the braking performance and to validate the braking system. The force is measured using a force sensor. In some embodiments, auxiliary units of any common non-contact type (to avoid any influence on the braking performance) such as near field communication (NFC), optical, solenoid, acoustic, etc. can be used to measure the parameters of the braking motor. In some embodiments, a set of permanent magnets may be attached to the brake motor shaft based on specific polarity arrangements and coils wound around its periphery can be used to measure the induced current/voltage during braking, and the induced current or voltage is used as the input of braking controller to establish the control strategy for the braking motor.

Figure 5:
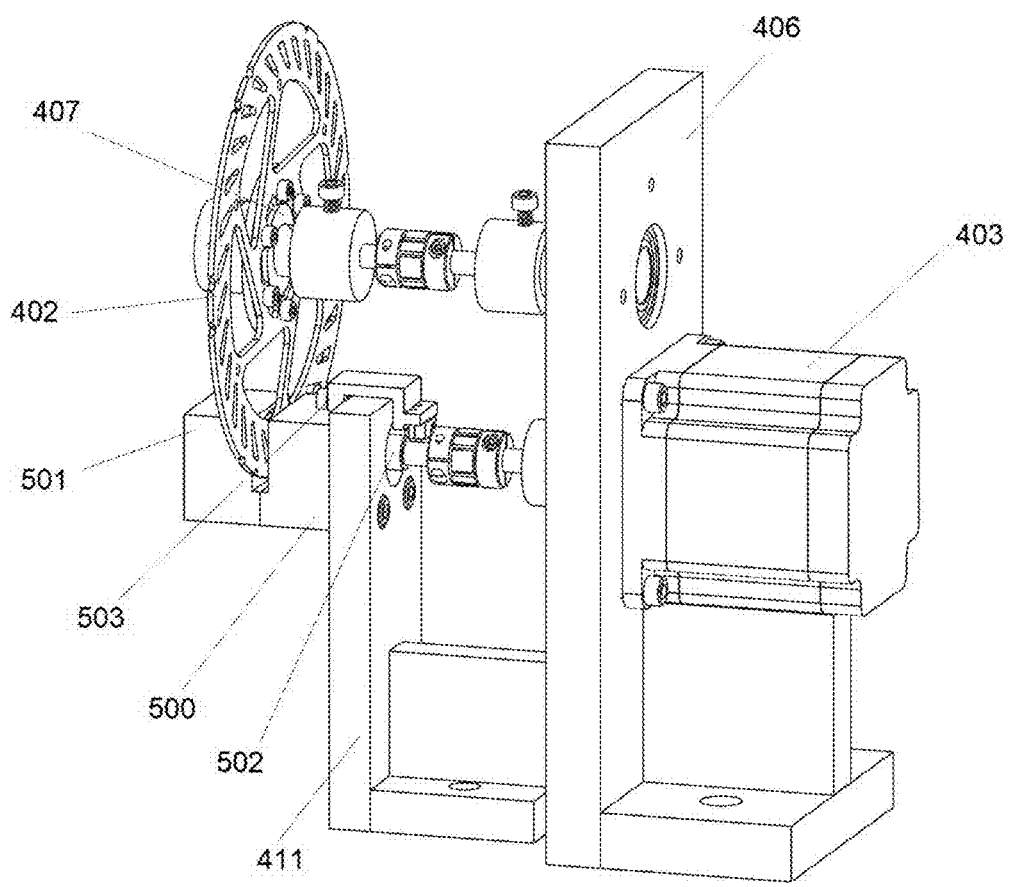
FIG. 5 is a schematic of the test fixture showing the braking mechanism of a single motor flexible rotor-fixed caliper design.

FIG. 5 is a schematic of the test fixture showing the braking mechanism of a single motor flexible rotor-fixed caliper design. For consistency, the same element numbers have been used as were used and described previously. In some embodiments, the brake motor, 403, is mounted on one side of a clamping plate, 406, whereas the caliper block assembly, 500, and 501 is mounted on the other side. Limit switch, 503, constrains the caliper.

Figure 6:
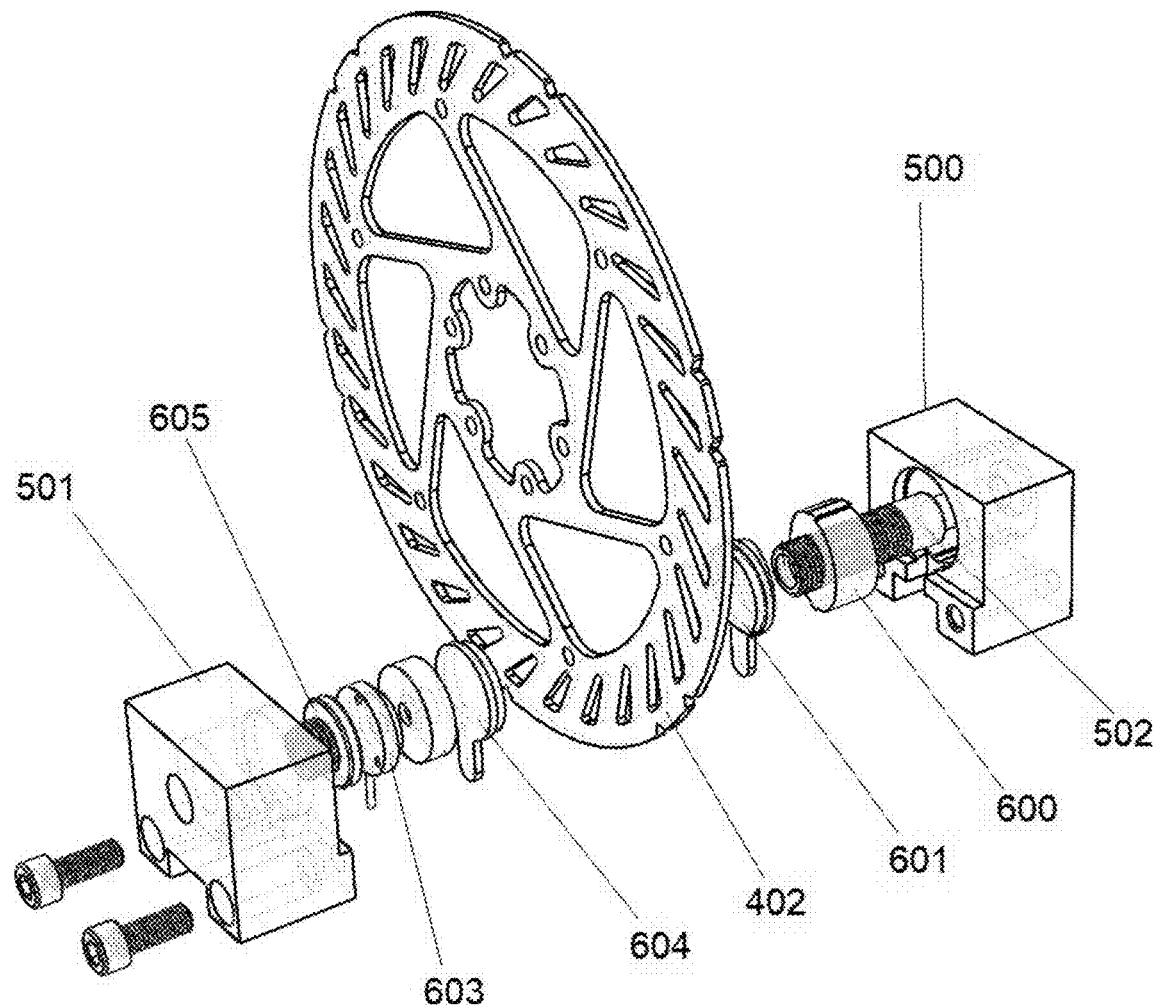
FIG. 6 is an exploded view of the single motor flexible rotor-fixed caliper design electromechanical wedge brake.

FIG. 6 is an exploded view of the single motor flexible rotor-fixed caliper design electromechanical wedge brake. For consistency, the same element numbers have been used as were used and described previously. The plunger, 600, is a cylindrical segment with a threaded hole and a pair of protruding guideways at its periphery along its axis to allow it to slide within a slotted hole of the caliper block, 500. The leading face of the plunger, 600, is wedged to engage the inside brake pad, 601, at an inclined angle. The motion of the plunger, 600, within the caliper block, 500, over the screw shaft, 502, is controlled by a limiting force recorded by the load sensor, 603, once the brakes are applied completely by a limit switch at the trailing end. The leading end of the plunger, 600, mates with its wedge counterpart on the inner brake pad, 601. While the brakes are off, the inner pad, 601, attaches to the magnetic end of the screw shaft, 502, to avoid contact with the rotor, 402. Once the brakes are applied, the plunger, 600, pushes the brake pad, 601, against the rotor, 402. The rotor, 402, being flexible deforms elastically to contact a fixed flat brake pad, 604, placed on the other end of the rotor, 402. The distance between the rotor, 402, and the outside brake pad, 601, can be altered using an adjustment screw, 605.

Figure 7:
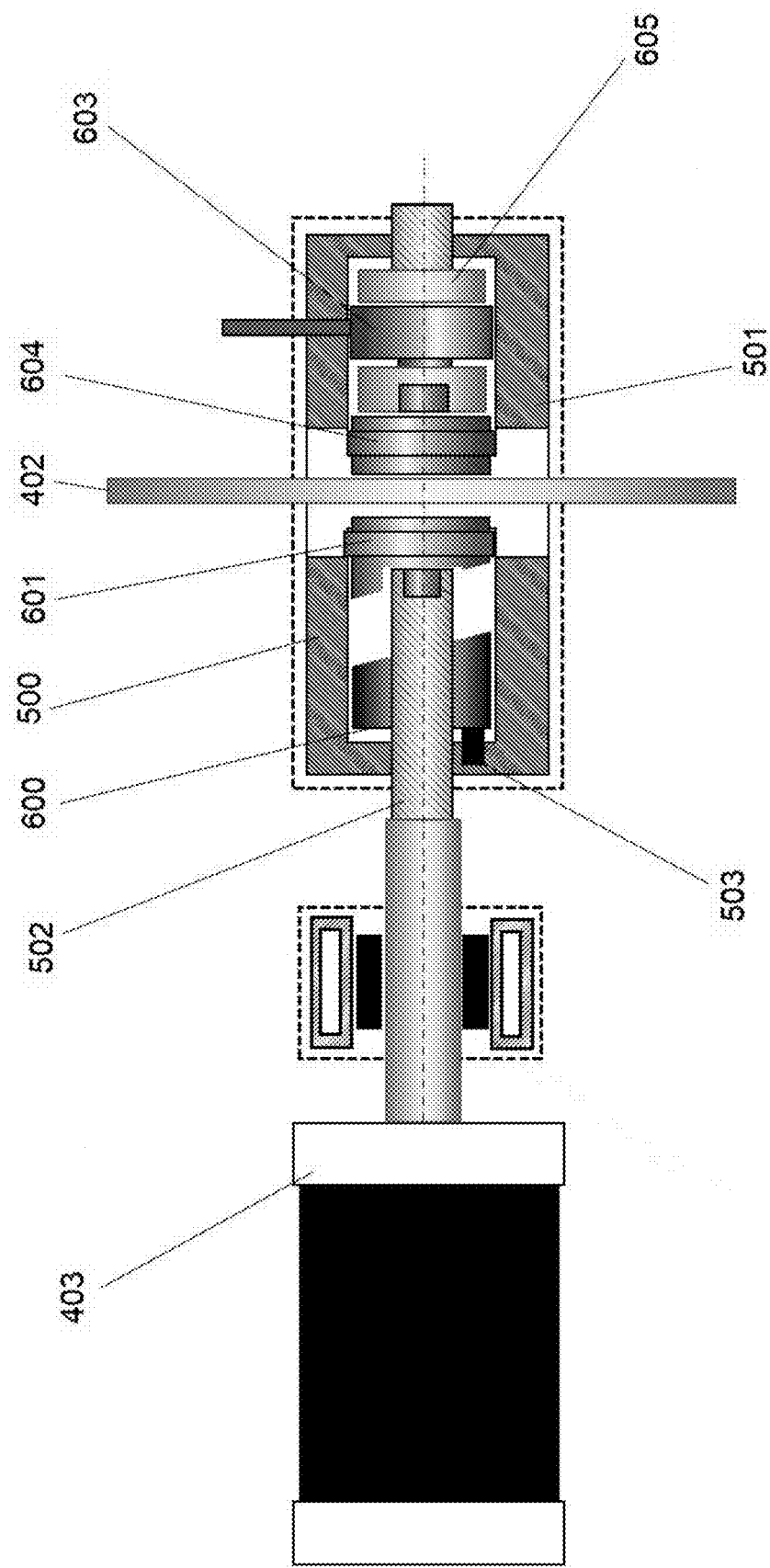
FIG. 7 is a cross-section of the braking mechanism employed in the single motor flexible rotor-fixed caliper design.

FIG. 7 is a cross-section of the braking mechanism employed in the single motor flexible rotor-fixed caliper design as described with respect to FIG. 6. For consistency, the same element numbers have been used as were used and described previously.

Figure 8:
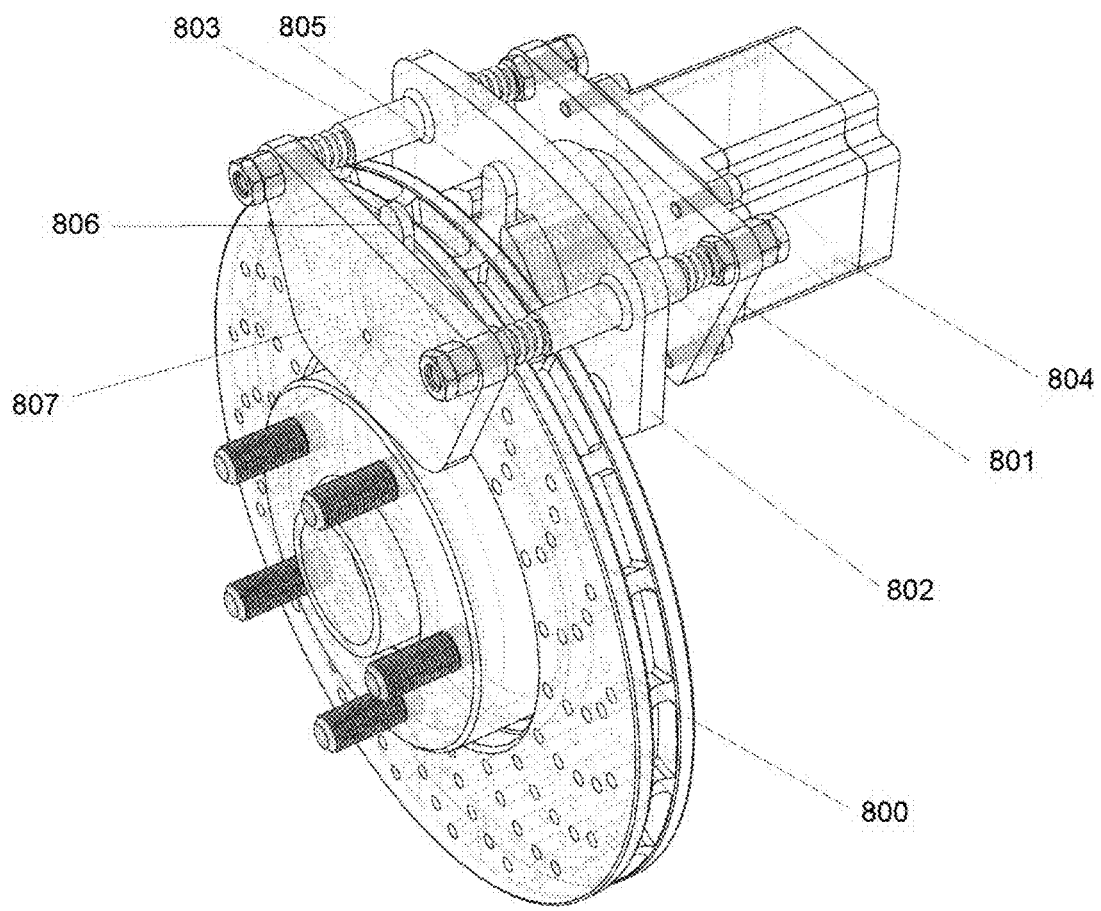
FIG. 8 is a schematic of the braking mechanism of a single motor floating caliper braking system.
Figure 9:
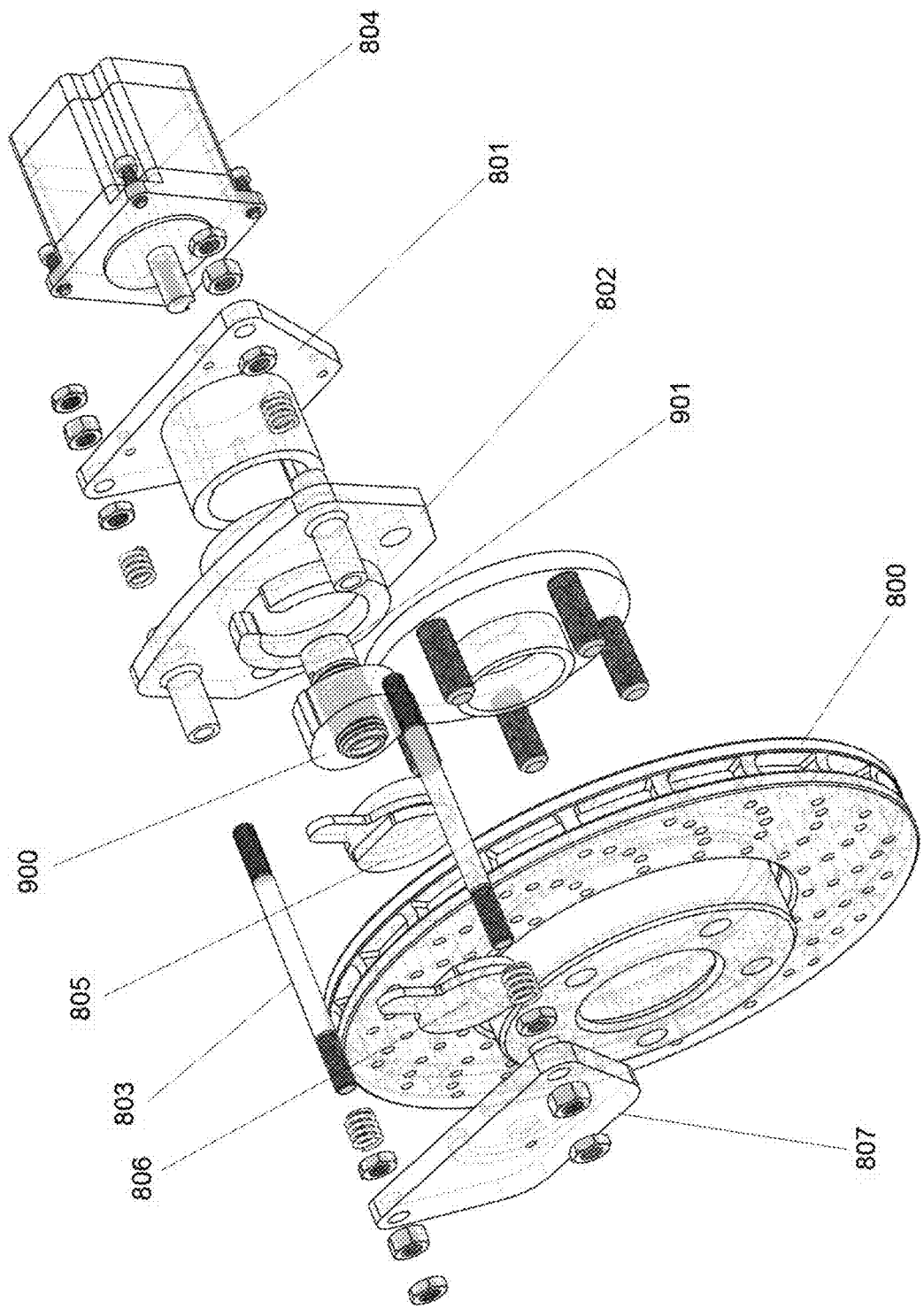
FIG. 9 is an exploded view of the single motor floating caliper braking system.

FIG. 8 is a schematic of the braking mechanism of a single motor floating caliper braking system. FIG. 9 is an exploded view of the single motor floating caliper braking system. For consistency, the same element numbers have been used as were used and described previously. In some embodiments, the floating caliper braking system comprises a rigid rotor, 800, with floating caliper, 801, type wedge brakes. The floating caliper, 801, is mounted on the brake adaptor, 802, using two spring loaded guide rods, 803. The body of the floating caliper, 801, has a hollow piston that reciprocates about the brake adapter, 802, on one side, and a brake motor, 804, on the other side. The brake motor, 804, drives the plunger, 900, through the screw shaft, 901. Once the brakes are applied, the plunger, 900, pushes the tilted brake pad, 805, against the rotor, 800, till contact is made. Once it cannot go any further, the plunger, 900, will push the floating caliper, 801, backwards, and in doing so, it will draw the opposite brake pad, 806, closer to the rotor, 800. The opposite side brake pad, 806, is mounted on the flat plate, 807, which in turn is spring loaded through the same guide rods, 803, of the floating caliper, 801, to the brake adapter, 802.

Figure 10:
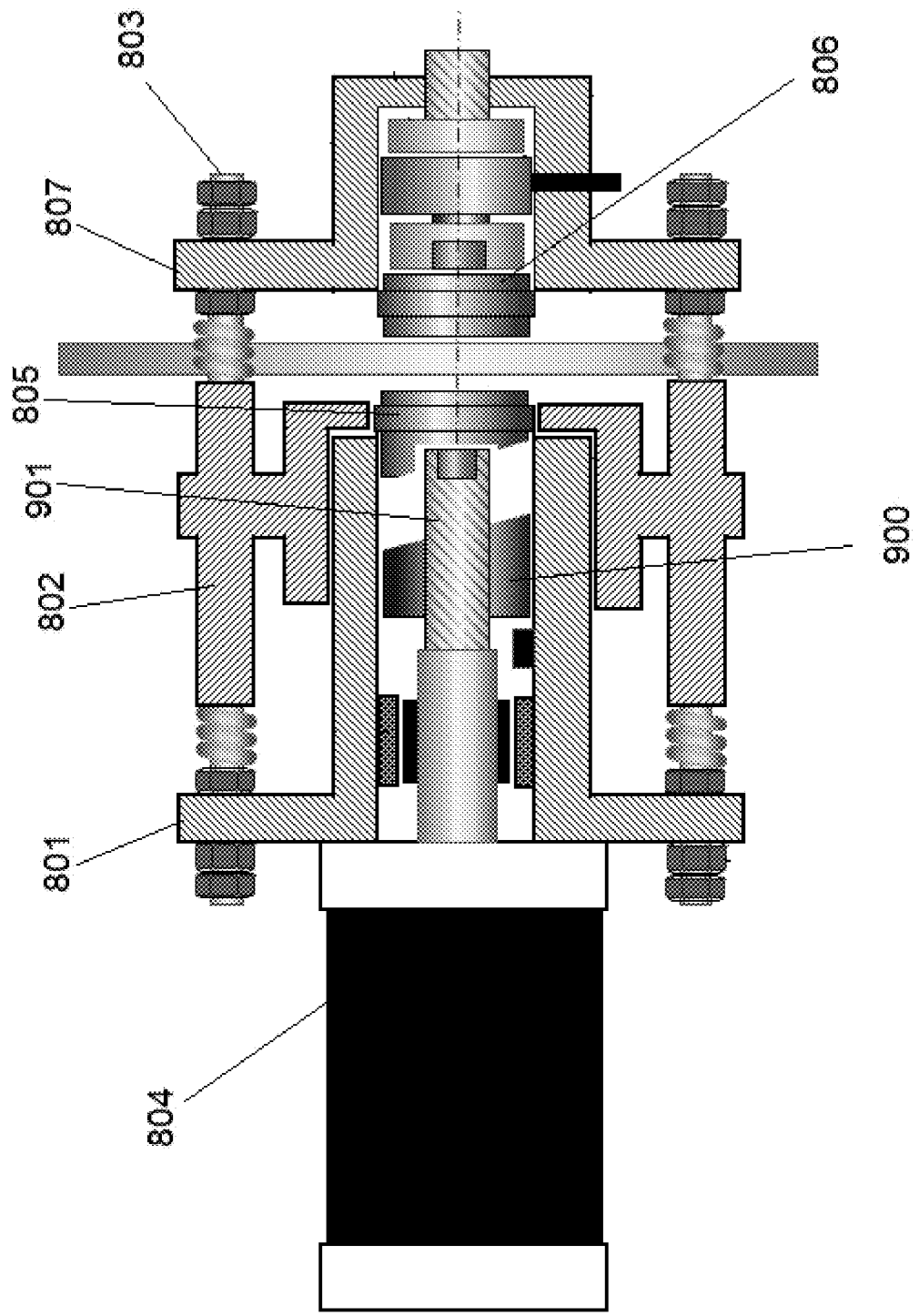
FIG. 10 is a cross-section of the braking mechanism employed in the single motor floating caliper braking system.

FIG. 10 is a cross-section of the braking mechanism employed in the single motor floating caliper braking system. For consistency, the same element numbers have been used as were used and described previously.

Figure 11:
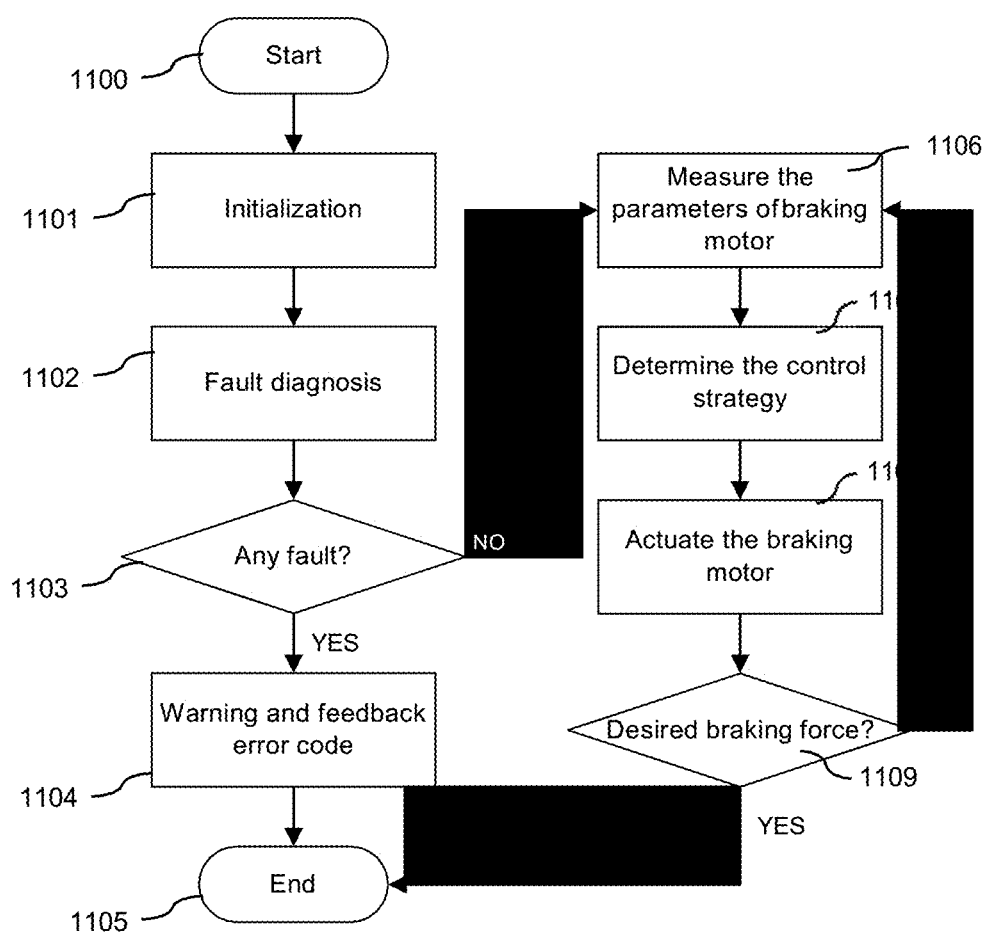
FIG. 11 is a flowchart describing possible modes of operation of the braking system.

FIG. 11 is a flowchart describing possible modes of operation of the braking system. In operation 1100, the operation of the braking system is begun. In operation 1101, the system is initialized. In operation 1102, the system is diagnosed to confirm that there are no faults. Operation 1103 is a decision operation. If there is a fault detected in operation 1103, the system advances to operation 1104 wherein warning and error codes are generated and communicated or displayed. The system then proceeds to the end step, 1105, and awaits repair or correction of the fault. In decision operation 1103, if there are no faults, the system proceeds to operation 1106 where the parameters of the braking system are determined. In operation 1107, a control strategy for the braking system is employed. In operation 1108, the braking motor is activated using the control strategy. Operation 1109 is a decision operation. If the desired braking force has not been applied, the system loops back to operation 1106 and the operations from 1106 through 1108 are repeated. If the desired braking force has been applied, the system then proceeds to the end step, 1105.

Figure 12:
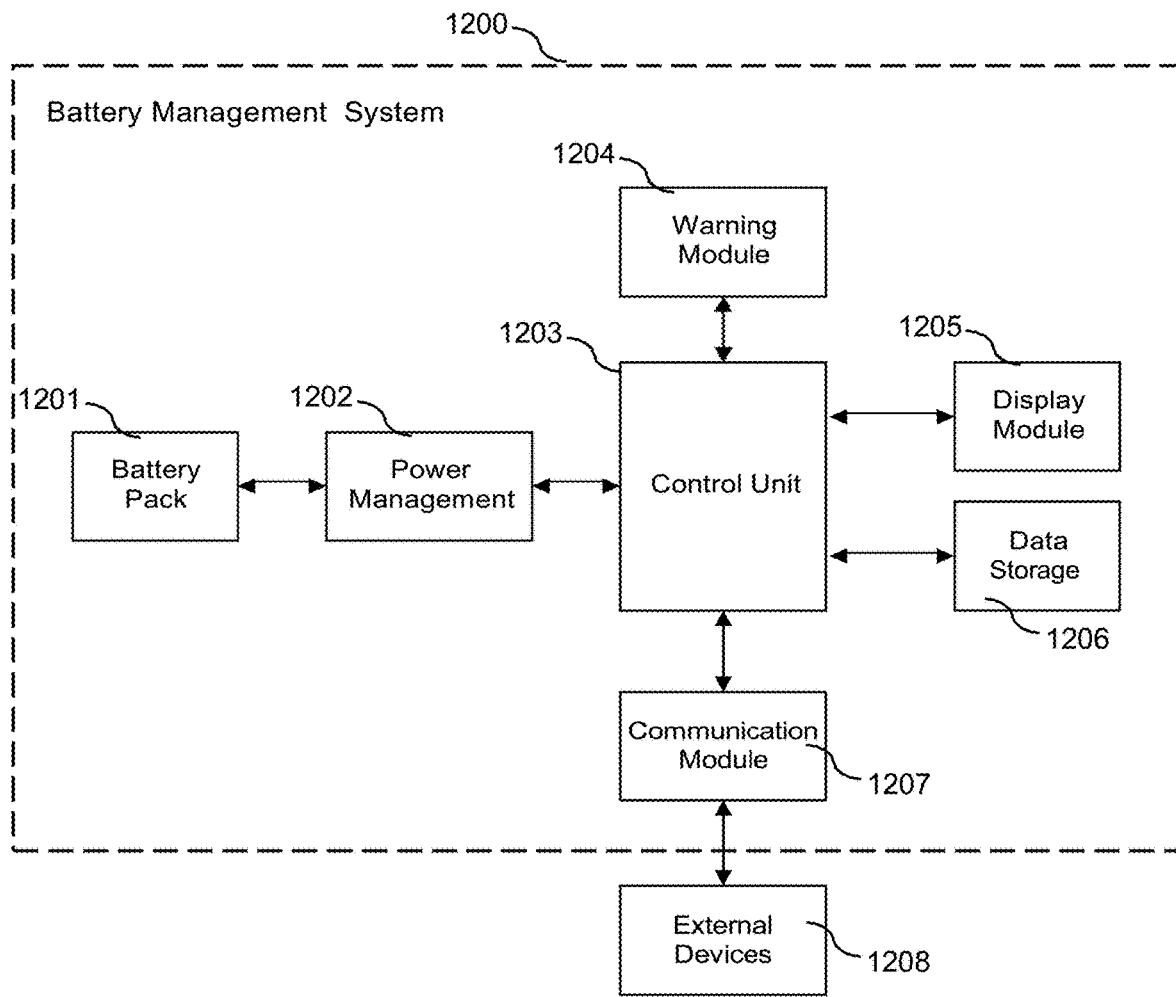
FIG. 12 is a block diagram of a battery management system.

FIG. 12 is a block diagram of a battery management system (BMS). In some embodiments, a configuration of a BMS, 1200, is described. In some embodiments, the BMS, 1200, includes a battery pack, 1201, including a plurality of battery cells, power management, 1202, control unit, 1203, warning module, 1204, display module, 1205, data storage, 1206, communication module, 1207. BMS, 1200, may be connected to external devices, 1208.

Figure 13:
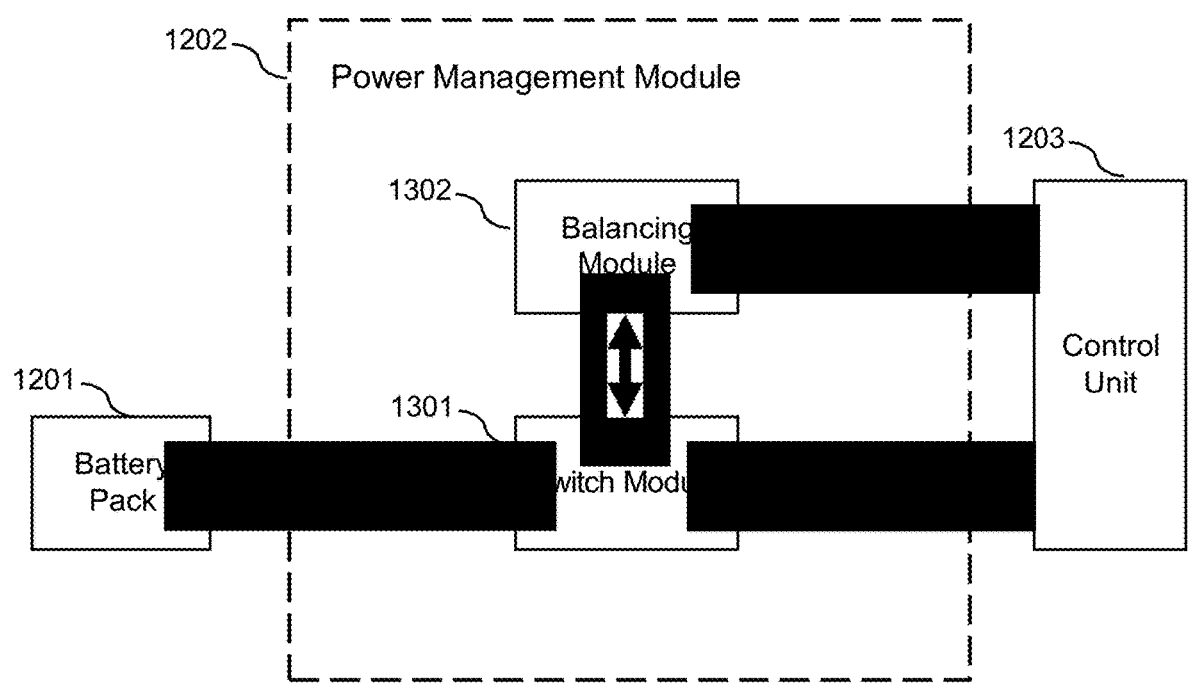
FIG. 13 is a block diagram of a power management module.

FIG. 13 is a block diagram of a power management module. For consistency, the same element numbers have been used as were used and described previously. In some embodiments, battery pack, 1201, is connected to the power management module, 1202, via a harness. In some embodiments, the power management module, 1202, includes a switch module, 1301, and balancing module, 1302.

In some embodiments, the power management module, 1202, comprises switch module, 1301, balancing module, 1302, and other modules (not shown) which are used to measure and filter voltage and current, and to protect system circuits. In some embodiments, the power management module, 1202, has a function of diagnosing, recognizing and protection from overcharge, over discharge, over voltage, under voltage, overheating, short circuit, and open circuit problems.

In some embodiments, the switch module, 1301, and balancing module, 1302, are connected. The switch module, 1301, has the function of channel switching, which is determined by the number of battery cells in the battery pack, 1201, and is controlled by control unit, 1203.

In some embodiments, control unit, 1203, has the function of repeatably uploading and updating the control strategy for power management module, 1202, warning module, 1204, display module, 1205, data storage, 1206, communication module, 1207, through communication module, 1207, and information processing for the parameters obtained from the internal modules and external devices.

In some embodiments, BMS, 1200, comprises communication module, 1207. Communication module, 1207, has the function of information exchange for the BMS, 1200, and external devices. In some embodiments, communication module, 1207, has the function of uploading and updating control strategies, and communicating with external devices through wired or wireless communication methods such as Inter-Integrated Circuit (IIC), Serial Peripheral Interface (SPI), Controller Area Network (CAN), 2.4G or 5G Wireless Fidelity (Wi-Fi), and Bluetooth.

In some embodiments, BMS, 1200, comprises warning module, 1204. Warning module, 1204, has the function of generating a sound signal, an optical signal, and/or a vibration signal in response to a detected system fault.

In some embodiments, BMS, 1200, comprises display module, 1205. Display module, 1205, has the function of information display. The voltage, current, state of charge (SOC), state of health (SOH), and temperature of the battery pack, 1201, temperature of the battery cells, and working status and location of the battery management system 1201 can be determined and represented on display module, 1205. The detailed information is programmable through control unit, 1203, and communication module, 1207.

In some embodiments, BMS, 1200, comprises data storage module, 1206. Data storage module, 1206, has the function of saving specific information to readable and writable storage media. Data storage module, 1206, may use Secure Digital Memory Card (SD card), Universal Serial Bus flash driver (USB flash driver), floppy disk, DVD, or other common storage media.

Figure 14:
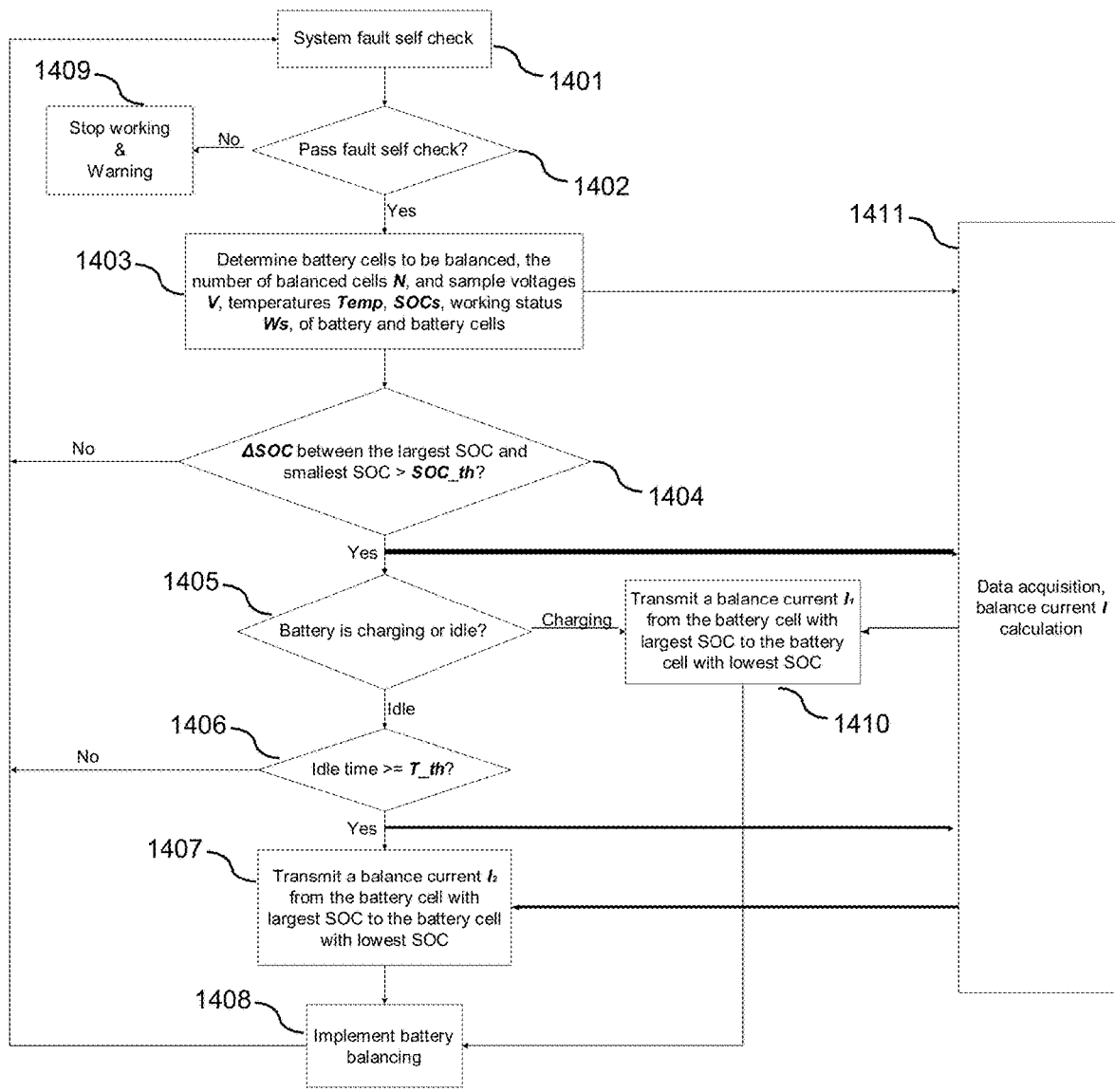
FIG. 14 is a flowchart of a battery balancing strategy.

FIG. 14 is a flowchart of a battery balancing algorithm. In some embodiments, the control unit described previously is used to control each module. Specifically, the control unit includes software designed to implement an algorithm to balance a battery pack as outlined in FIG. 14.

In operation 1401, the algorithm performs a system check to determine the existence of any faults. Operation 1402 is a decision operation. If there is a fault detected in operation 1401, the system advances to operation 1409 wherein warning and error codes are generated and communicated or displayed and the system awaits repair or correction of the fault. If no faults are detected in operation 1401, the system determines the battery cells and parameters to be balanced in operation 1403. These data are communicated to the data acquisition and balance current calculation operation, 1411. Operation 1404 is a decision operation. If the difference between the largest and smallest SOC is greater than a predetermined threshold (SOC_th), the system advances to operation 1405. If the difference between the largest and smallest SOC is less than a predetermined threshold (SOC_th), the system is balanced and returns to the starting operation, 1401. Operation 1405 is a decision operation. If the battery pack is currently charging, a balance current is transmitted from the battery cell with the largest SOC to the battery cell with the smallest SOC in operation 1410 in accordance with balance current calculation from operation 1411. If the battery pack is idle, the system advances to operation 1406. Operation 1406 is a decision operation. If an idle time between charging is greater than a predetermined time threshold (T_th), the system returns to the balance current calculation in operation 1411 to request new balance parameters and advances to operation 1407. If an idle time between charging is greater than a predetermined time threshold (T_th), a balance current is transmitted from the battery cell with the largest SOC to the battery cell with the smallest SOC in operation 1407 in accordance with balance current calculation from operation 1411 and the system advances to operation 1408 to implement the battery balancing. If an idle time between charging is less than a predetermined time threshold (T_th), the system is balanced and returns to the starting operation, 1401.

The calculated balancing current from operation 1411 is a function of the acquired data or parameters, for example, I=f(N, V, Temp, Temp_th, SOCs, ΔSOC, SOC_th, Ws, T_th), where N is the number of battery cells to be balanced, V is the voltage of the battery and battery cells, Temp is the temperature of the battery and battery cells, SOCs are the stage of charge of the battery and battery cells, ΔSOC presents the difference between largest SOC and the smallest SOC of battery cells, Temp_th, SOC_th and T_th are predetermined values, and Ws denotes the working status of battery pack.

Although various embodiments which incorporate the teachings of the present invention have been shown and described in detail herein, those skilled in the art can readily devise many other varied embodiments that still incorporate these teachings.

What is claimed is:

1. A battery management system, the battery management system comprising:
   a battery pack, wherein the battery pack comprises a plurality of battery cells;
   a power management module;
   a control unit;
   a warning module;
   a display module;
   a data storage module; and
   a communication module;
   wherein the control unit is configured to repeatably upload and update, through the communication module, the control strategy for the modules of the system and the information processing for the parameters obtained during its operation.

2. The battery management system of claim 1 wherein the power management module further comprises a balancing module and a switching module.

3. The battery management system of claim 2 wherein the balancing module and the switching module are connected.

4. The battery management system of claim 3 wherein the warning module is configured to generate at least one of a sound signal, an optical signal and/or a vibration signal in response to a detected system fault.

5. The battery management system of claim 1 wherein the data storage module comprises at least one of Secure Digital Memory Card (SD card), Universal Serial Bus flash driver (USB flash driver), floppy disk, DVD, or other common storage media.

6. The battery management system of claim 1 wherein the communication module communicates with external devices through a wired or a wireless communication method.

7. The battery management system of claim 6 wherein the wired or a wireless communication method comprises at least one of Inter-Integrated Circuit (IIC), Serial Peripheral Interface (SPI), Controller Area Network (CAN), 2.4G or 5G Wireless Fidelity (Wi-Fi), or Bluetooth.

8. The battery management system of claim 7 wherein the battery pack is connected to the power management module via a harness.

9. A computer-implemented method for balancing the battery pack of the battery management system of claim 1, the method comprises executing on the control unit the steps of:
   performing a system check to determine the existence of any faults;
   generating warning and error code if a fault is detected; and
   waiting for repair or correction of the fault.

10. The computer-implemented method of claim 9 further comprising determining battery cells and parameters to be balanced if no fault was detected, wherein the parameters are at least one of sample voltage (V), temperature (T), state of charge (SOC), or working status (Ws).

11. The computer-implemented method of claim 10 further comprising determining if the SOC is higher than a predetermined threshold (SOC_th).

12. The computer-implemented method of claim 11 further comprising determining if the battery pack is charging or idle.

13. The computer-implemented method of claim 12 further comprising transmitting a balance current from a battery cell with a highest SOC to a battery at the lowest SOC if the battery pack is charging.

14. The computer-implemented method of claim 13 further comprising determining if an idle time of the battery pack is greater than or equal to a predetermined time threshold (T_th) if the battery pack is idle.

15. The computer-implemented method of claim 14 further comprising transmitting a balance current from a battery cell with a highest SOC to a battery at the lowest SOC if the idle time is greater than or equal to a predetermined time threshold (T_th).

16. The computer-implemented method of claim 15 further comprising returning to the start of the algorithm if the idle time is less than a predetermined time threshold (T_th).

* * * * *